June 12, 1956   E. L. SIEMER   2,749,608
METHOD OF AND APPARATUS FOR MAKING HEAT AND
COLD INSULATION PIPE COVERING
Filed March 3, 1952   2 Sheets-Sheet 1
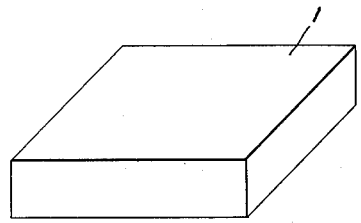
Fig. 1.
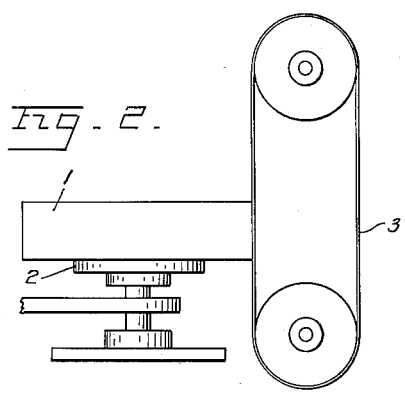
Fig. 2.
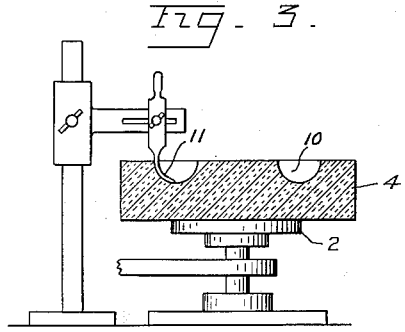
Fig. 3.
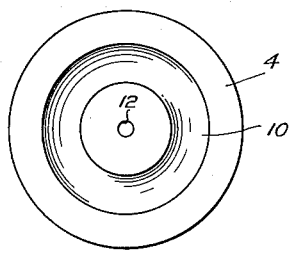
Fig. 5.
Fig. 4.
Fig. 7.
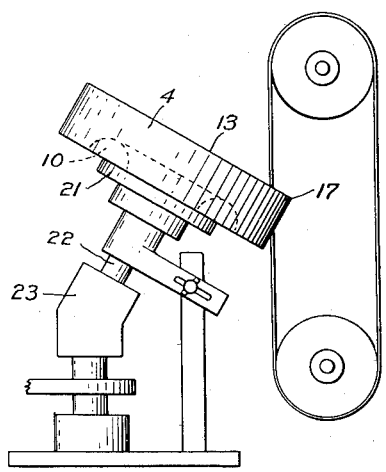
Fig. 6.
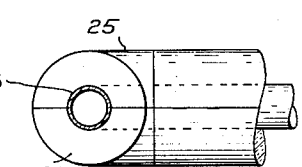
Fig. 8.
INVENTOR.
EDWARD L. SIEMER
BY Alexander Riaboff
ATTORNEY June 12, 1956    E. L. SIEMER    2,749,608
METHOD OF AND APPARATUS FOR MAKING HEAT AND
COLD INSULATION PIPE COVERING Filed March 3, 1952    2 Sheets-Sheet 2

INVENTOR.
EDWARD L. SIEMER
BY Alexander Riaboff
ATTORNEY

United States Patent Office 2,749,608
Patented June 12, 1956

2,749,608
METHOD OF AND APPARATUS FOR MAKING HEAT AND COLD INSULATION PIPE COVERING

Edward L. Siemer, Vallejo, Calif.

Application March 3, 1952, Serial No. 274,624

6 Claims. (Cl. 29—463)

My invention relates to a process of making heat and frost insulation covering and particularly relates to a method of making insulation coverings for pipe bends or elbows.

Presently pipe bends insulation coverings are made out of straight pipe covering sections. The latter consists of hollow half cylinders, two of which placed opposite each other cover a length of a pipe.

To make a pipe bend covering said straight pipe covering section is cut at an angle to the central axis into pieces, each piece being in form of an isosceles trapezoid if viewed from the inner side having a groove therein for a pipe to be covered. Then a piece is placed on one side of the bend to be covered and another piece is placed on the other side of said bend opposite the first piece, both pieces covering completely an angular segment of said pipe and the pieces are tied up together by a piece of wire. Thereupon another pair of pieces placed on said bend next to the first pair so that their isosceles sides abut the isosceles sides of the first pair and the latter pair is also wired together. This process is repeated until the whole bend is so covered by said pieces. Thereupon the bend cover is mudded with a trowel and a rubber palm. This process is a slow tedious task requiring a lot of time and skill.

The object of this invention is to substitute this process by a new one which requires much less time and which can be practiced by an unskilled laborer.

The other object of this invention is to make said bends out of blocks of heat and frost insulation material or to make said bend coverings out of moldings precast in a form of a half donut split horizontally through the center line of the same. Said half donut should be molded considerably larger than of the desired size, as the insulation material such as mud of asbestos, or aggregate material, shrink very considerably. The blocks or the dried moldings are machined into a horizontally split half donut of desired size, then a circular groove of the diameter slightly bigger than that of a pipe, which is desired to cover, is milled or otherwise made in the horizontal plane surface of said half donut. Then the half donut is cut into sections such as ⅛, ¼, or other size, each of which covers one side of 45°, 90° bend, or other bends respectively.

The other object of this invention is to provide new tools for performing certain operations on said heat and frost insulation materials.

Another object of this invention is to provide a new method of cutting some of the insulation materials.

Still another object of this invention is to provide a new method of cutting thermoplastic material which method is based upon application of heat, and consists of passing an electrically heated wire through said plastic material along and across the line of the desired cut.

Other objects and advantages will appear as the specification proceeds and the novel features of the device will be particularly pointed out in the claims hereto annexed.

In this specification and the annexed drawing the invention is illustrated in the form considered to be the best but it is understood, that the invention is not limited to such form; and it is also understood that in and by the claims following the description, it is desired to cover the invention in whatsoever form it may be embodied.

My invention is illustrated by the accompanying drawings in which:

Fig. 1 is a perspective view of a block of heat and frost insulation material.

Fig. 2 is a diagrammatic view of a revolving table and a band saw for cutting a block into a disk.

Fig. 3 is a diagrammatic view of a revolving table and a special tool for cutting a circular groove in a disk.

Fig. 4 is a central vertical cross-section through a disk showing a groove therein.

Fig. 5 is a plan view of a disk with a central hole therein.

Fig. 6 shows a device for cutting a corner off the disk.

Fig. 7 is a central vertical cross-section through a half donut.

Fig. 8 is a front elevation of a pipe bend covered with frost and heat insulation coverings.

Figure 9:
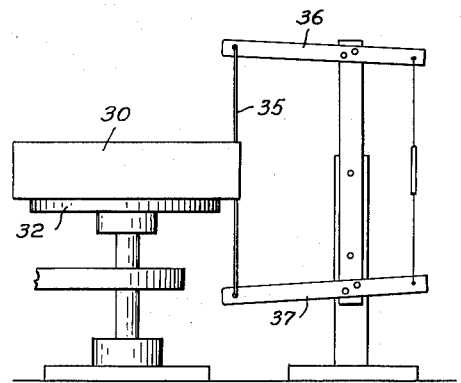
Fig. 9 is a diagrammatic view of a revolving table and an electric wire for cutting blocks of thermo-plastic material into disks.

My method of making heat and frost insulation pipe coverings for bends and elbows consists of taking a block 1 of heat and frost insulation material of sufficient size and, as a first step, cutting a disk 4 of desired size out of the same. If a block 1 is not large enough, then two or more blocks are glued together to form a block 1 of sufficient size to cut a proper disk 4 therefrom. The disk 4 may be cut out of the block 1 by various means, such as illustrated in Fig. 2 in which the block 1 is placed upon a round revolving table 2 at the edge of which is arranged a band saw 3. The table 2 is slowly rotated while the band saw cuts through the block.

After the disk 4 is made, a circular groove 10 is cut in the flat side of said disk. The diameter of said groove is slightly bigger than the diameter of a pipe which is to be covered by the insulation bend covering. The groove 10 may be made by various conventional tools, such as a lathe, wood turning machine, dado head, or by a special cutter 11 used in connection with the above mentioned revolving table 2, as shown in Fig. 3.

The next step is to cut a central hole 12 in the disk 4. This may also be done by various means, such as drills, or on a lathe, or wood turning machine.

The next step is to round the side 13 of the disk 4 so as to give it a half circular cross-section. For this operation the disk 4 is placed by the side containing the groove 10 on a revolving table, or wood cutting machine, or lathe, and the side 13 is rounded by some tool, the choice of a cutting tool and a machine depending upon the characteristics of the insulation material. For instance, pressed cork may easily be rounded by a rasp, while the disk 4 is slowly rotated on the revolving table 2. Such operation takes just a few minutes. By rounding the side 13 as shown in Fig. 7, the disk 4 is now transformed into a half donut 15, which may be produced by cutting a donut by a plane passing through its central circular line.

The last operation of transforming the disk 4 into a half donut 15 may also be accomplished by cutting the corner 17 of the disk with a band saw 20. For that purpose the disk 4 is secured to a turntable 21, which is arranged at an angle to said saw 20. The table 21 is supported on an inclined shaft 22 and is rotated through a universal joint 23, as shown in Fig. 6. By changing the angle at which band saw meets the disk 4, the corner 17 may be cut fairly closely to a circular cross-section and thereafter smoothed by a hand operation.

The half donut 15 is thereafter cut into any desired sections, such as one eighth of a circle to cover one side of 45° pipe bend, or a quarter of a circle to cover one side of 90° pipe bend, or any other desired arc. One of such cuts 25 is placed on one side of the pipe bend 26 and the other cut of the same size is placed on the other side of said bend to cover the same completely. Thereupon both pieces are wired together and covered with emulsion, or canvas to protect it from weather elements and give it a nice finish.

It may also be stated that pipe bends are being standardized now and most of the pipe bends follow the formula that the radius of a bend from the center of the bend to the central line of the pipe bend is equal to one and a half times the outside diameter of the pipe at such bend. The thickness of the wall of a pipe bend covering is 3" for an average pipe bend. Hence, it is possible now to manufacture said insulation pipe bend coverings wholesale for different diameters of pipes.

The above steps are applicable to all kinds of heat and frost insulation material. But the method of operation and tools may be radically changed depending upon the physical and chemical characteristics of a particular material, or of a class of materials. Some plastic materials have been used as heat and frost insulation materials, which cannot be conveniently and successfully operated upon as above described. One of them is well known in the trade under the trade-name of "Styrofoam." The latter is very light, foamy substance which cannot be conveniently cut or shaped in the above described manner. I discovered that this plastic can be effortlessly and speedily cut in various shapes by an electrically heated wire, which is passed through said plastic without actually burning it and leaving a nice clean and shiny surface. The wire is heated to a temperature less than red-hot so that its glow may be seen only in darkness. When the heated wire is introduced into said plastic, the heat dissolves the plastic which contacts the front edge of said wire and fills in the pores in said plastic, thus leaving a narrow crack between the two pieces. The heat applied to the wire is only sufficient to dissolve the plastic and to let the cutting wire to pass between the pieces, but is insufficient to dissolve so much plastic that the same be fused into a solid piece behind said wire, or to burn the plastic.

I prefer to use stiff wire of good quality as a cutter, and flatten the same into a very narrow thin blade. Cuts may be made of different cross-sections and each cut required a specially bent wire corresponding to said cross-section. To keep that cross-section steadily for a long time, the wire must be stiff and of good steel.

Figure 10:
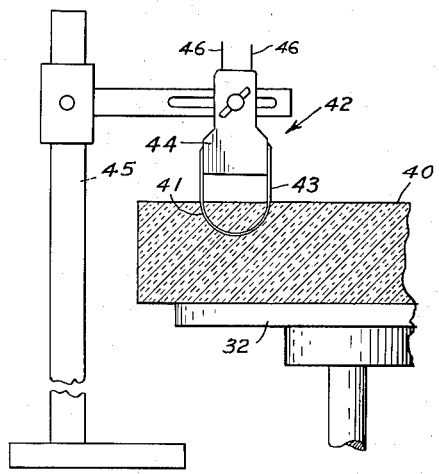
Fig. 10 is a diagrammatic view of a revolving table and a special tool for cutting a circular groove in a disk of thermo-plastic material.

The method of making heat and frost insulation coverings for pipe bends out of Styrofoam, and other thermoplastics, that is plastics which are dissolved by application of heat and which solidify at normal temperatures, consists of taking a block 30 of such plastic and cutting a disk out of the same. This may be done by placing said block 30 on a round rotating table 32 and securing said block to said table. Thereupon the table 32 is slowly rotated while an electrically heated wire 35 strung between two members 36 and 37 as shown in Fig. 9 is slowly introduced into said block to a desired depth and held stationary until said table makes one complete revolution. The disk 40 is thus cut. This operation required only a very few minutes and produces nice clean shiny cut. The next operation is to make a circular groove 41. This is done on the same table 32, by a tool 42 shown in Fig. 10. This tool consists of a piece of flattened wire 43 bent into a half circle of a diameter which is slightly bigger than the outside diameter of the pipe to be covered, said wire being attached to a handle 44 made of some insulation material. Wires 46 connect the tool 42 with a source of electric energy. While the disk 40 is slowly rotated, the wire 43 is introduced into the upper surface of the disk at the desired place and to a desired depth. Then the tool 42 is held stationary in the stand 45 while the table makes one complete revolution and the groove 41 is cut. This operation also takes just a very few minutes.

Figure 11:
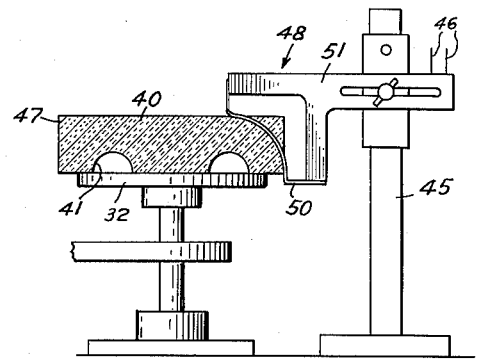
Fig. 11 is a diagrammatic view of a revolving table and a special tool for rounding an outside corner of a disk of thermo-plastic material.
Figure 12:
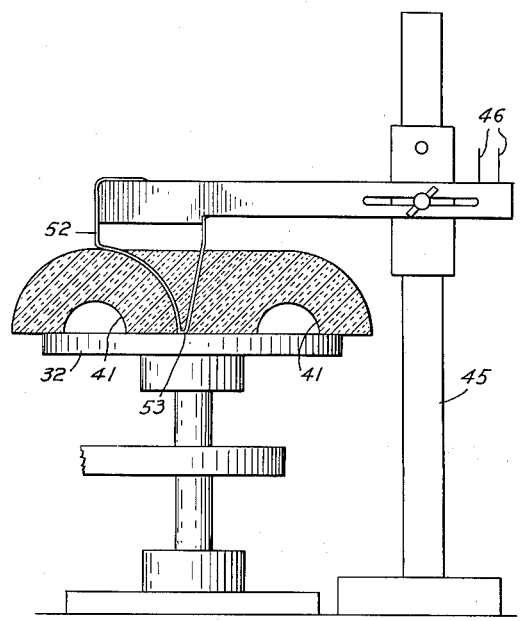
Fig. 12 is a diagrammatic view of a revolving table and of a special tool for cutting a central hole in a disk and rounding the inner surface therearound.
Figure 13:
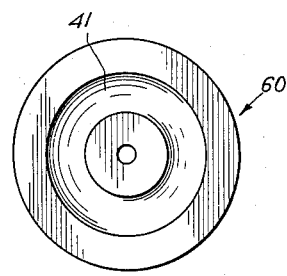
Fig. 13 is a plan view of a half donut.

Then the disk 40 is placed with its grooved side down on the turntable 32 in preparation to the next operation which is rounding the grooveless side, and thus transforms the disk into a half donut. The outside corner 47 of the disk 40 is rounded by a special tool 48 shown in Fig. 11 which represents a piece of flattened wire in form of a quadrant 50 carried by a handle 51 made out of insulation material. The quadrant 50 corresponds to the cross-section of the piece of plastic to be cut off the disk 40. The quadrant 50 is slowly introduced into the disk 40, while the same is rotated with the table 32, to a desired depth and then held stationary on the stand 45, while the table makes one complete revolution. The inner side of the disk 40 is cut by a quadrant 52 which is somewhat different from the quadrant 50 and is shown in Fig. 12. It has a comparatively sharp corner 53 which cuts the plastic down to the table while the table is rotating, thus making a hole and rounding the inner outside surface of the donut in one operation. The disk 40 is thus transformed into a half donut 60, which may be cut into desirable pieces by application of straight heated wire. The pieces are used to cover a pipe bend as above described.

It is obvious that if a pipe bend is not circular but is of some other shape, such as oval, parabolic or S-shaped or of other shape, the groove 41 is cut by the same tool 42, but said tool is moved along a line representing the longitudinal outline of the particular bend. This may be done manually as no effort is required to cut said material by said method. Two symmetrical pieces are made and applied to a bend opposite each other to provide a complete cover for the same.

If a pipe bend to be covered is comparatively large, and there is no block of insulation material big enough from which a suitable half donut can be made, a molding in form of a rough half donut is made from which a half donut of desired dimensions is machined to the proper size. A molding if made out of mud of asbestos, aggregate material is made of considerably larger size than the actual size desired, as this insulating material shrinks considerably. The rough half donut is machined in the above described way into a true half donut. The cuttings may be ground and used again in a next molding as molding material. The half donut is cut into segments to be placed on the bend. Usually two segments placed one opposite the other cover all bend. But when a bend is particularly large and its covering cannot be conveniently handled in one piece, it may be made in several sections and placed on said bend and the opposite sections wired together.

After the pipe coverings have been secured on the bend by wire, they are covered by emulsion and a canvas may be applied also if desired.

I claim:

1. A process of applying heat and frost insulation covering on a pipe bend out of insulation material, including making a disk out of insulation material of a radius equal to the sum of the outside radius of the bend and the desired thickness of the insulation covering, cutting a circular groove in said disk, the central line of said circular groove being on a radius equal to that of the center line of the pipe bend, said circular groove being half-circular in cross-section and of a diameter slightly larger than the outside diameter of the pipe, cutting the material off said disk to form a wall of uniform thickness around said groove of desired length; cutting said disk into segments; applying one segment on one side of the bend and the other segment on the other side of the pipe, and binding said segments together.

2. A device for cutting thermoplastic material comprising a rotatable table, means for rotating the same, said table being adapted to support and retain a piece of thermoplastic material, a piece of stiff curved wire, means for heating the same electrically, means for pushing said wire into said piece of thermoplastic material while the latter is rotated with said table, and means for rigidly supporting said wire to permit the latter to cut through said thermoplastic material.

3. A device for cutting thermoplastic material comprising a horizontal rotatable table for supporting and retaining thereon a piece of thermoplastic material, a cutter for said material consisting of a piece of stiff curved wire, means for heating the same electrically, said cutter being attached to a handle, a stand for rigidly supporting said handle, means associated with said stand for changing the position of said cutter in relation to said material to permit said cutter to enter said material and cut the same while the latter is rotated with said table.

4. The method of constructing a heat and cold insulating covering for a pipe bend out of thermoplastic material, comprising making a disk out of said material of a radius equal to the sum of the outside radius of the bend and the desired thickness of the insulating covering by slowly rotating a block of said material against an electrically heated wire strung perpendicularly to the plane of rotation; cutting a circular groove in said disk by continued rotation of said disk and forcing into the upper surface of the disk an electrically heated loop of the diameter substantially equal to the diameter of said pipe; shaping the disk into a ring of a half-circular cross-section by continued rotation of said disk and by applying an electrically heated wire substantially equal to a quarter of a circle to the outside circumference of said disk and to the center thereof; cutting said ring into segments, sandwiching said pipe bend between two segments and binding said segments together.

5. The method of making a cold and heat insulating segment for a pipe bend out of a block of thermoplastic material consisting of placing said block on a turntable and rotating the same; applying an electrically heated straight wire to said material for cutting said block into a disk; applying a loop-shaped wire electrically heated for cutting a circular groove in said disk; applying an electrically heated quarter circular wire at the periphery and at the center of the disk for cutting the same into a ring of a half circular cross-section; and cutting the same into segments.

6. The method of making a cold and heat insulating segment for a pipe bend out of a disk of thermoplastic material comprising the following steps: placing said disk on a rotating table, cutting a groove in said block of the diameter substantially equal to the diameter of said pipe by forcing into the upper surface of said disk an electrically heated loop while said disk is rotating; and shaping said disk into a ring half-circular in cross-section by trimming the excess of said thermoplastic material by applying a quarter circular electrically heated wire to the outer circumference of said disk and to the center of the same, and cutting said ring into segments.

References Cited in the file of this patent

UNITED STATES PATENTS

| | | |
|---|---|---|
| 168,801 | Stevens | Oct. 11, 1875 |
| 1,409,995 | Bosworth | Mar. 21, 1922 |
| 1,674,753 | Witter | June 26, 1928 |
| 1,677,498 | Smith | July 17, 1928 |
| 1,723,221 | Vandervoort et al. | Aug. 6, 1929 |
| 1,743,125 | Fleming | Jan. 14, 1930 |
| 1,755,308 | Smith | Apr. 22, 1930 |
| 1,776,145 | Bungay | Sept. 16, 1930 |
| 1,808,105 | Gouverneur | June 2, 1931 |
| 1,821,611 | Bonsieur | Sept. 1, 1931 |
| 1,955,395 | Tueth | Apr. 17, 1934 |
| 2,086,238 | Platt | July 6, 1937 |
| 2,150,155 | Davis | Mar. 14, 1939 |
| 2,199,366 | Wenn | Apr. 30, 1940 |
| 2,362,967 | Bivans | Nov. 21, 1944 |
| 2,381,193 | Vaszin | Aug. 7, 1945 |
| 2,462,707 | Allen | Feb. 22, 1949 |
| 2,526,650 | Gaibel | Oct. 24, 1950 |
| 2,582,368 | Williams | Jan. 15, 1952 |
| 2,708,307 | Newell | May 17, 1955 |